(12) United States Patent
Oksanen

(10) Patent No.: US 7,024,194 B1
(45) Date of Patent: Apr. 4, 2006

(54) COMMUNICATION SYSTEM

(75) Inventor: Lauri Oksanen, Helsinki (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/786,772

(22) PCT Filed: Sep. 7, 1999

(86) PCT No.: PCT/IB99/01546

§ 371 (c)(1),
(2), (4) Date: Jun. 8, 2001

(87) PCT Pub. No.: WO00/14907

PCT Pub. Date: Mar. 16, 2000

(30) Foreign Application Priority Data

Sep. 7, 1998 (GB) .................................. 9819482

(51) Int. Cl.
*H04Q 7/20* (2006.01)
(52) U.S. Cl. .................. 455/437; 455/439; 455/456.5; 370/332; 342/357.09
(58) Field of Classification Search ................ 455/436, 455/437, 439, 440, 443, 442, 456.1, 456.5, 455/456.6, 502, 507; 342/357.09, 357.1, 342/357.02, 357.03, 357.06; 370/331, 332, 370/333, 334, 315, 320, 350, 515, 507, 516
See application file for complete search history.

(56) References Cited

U.S. PATENT DOCUMENTS

| | | | |
|---|---|---|---|
| 5,440,561 A | 8/1995 | Werronen | ................ 370/105.1 |
| 5,594,718 A | 1/1997 | Weaver, Jr. et al. | ........ 370/331 |
| 5,640,679 A | 6/1997 | Lundqvist et al. | ......... 455/33.2 |
| 5,649,000 A * | 7/1997 | Lee et al. | .................... 455/436 |
| 5,870,427 A * | 2/1999 | Tiedemann et al. | ......... 375/216 |
| 5,912,886 A * | 6/1999 | Takahashi et al. | .......... 370/350 |
| 6,026,301 A * | 2/2000 | Satarasinghe | ............... 455/436 |
| 6,526,039 B1 * | 2/2003 | Dahlman et al. | ........... 370/350 |

FOREIGN PATENT DOCUMENTS

| | | |
|---|---|---|
| EP | 0589753 | 3/1994 |
| WO | WO 94/30024 | 12/1994 |
| WO | WO 97/31503 | 8/1997 |

OTHER PUBLICATIONS

English eqivalent—New Zealand Patent Application No. 248564.

* cited by examiner

*Primary Examiner*—Nay Maung
*Assistant Examiner*—Edan Orgad
(74) *Attorney, Agent, or Firm*—Perman & Green, LLP

(57) ABSTRACT

A method for distributing timing information in a radio communication system comprising: a network including a plurality of base stations, each capable of transmitting and receiving radio communication signals to and from a respective coverage area, and including a first base station and one or more neighboring base stations whose coverage areas neighbor the coverage area of the first base station; and a first mobile station capable of receiving signals from the first base station; the method comprising: estimating the differences in timing between those base stations; and transmitting indications of those differences in timing to the first mobile station.

25 Claims, 2 Drawing Sheets

COMMUNICATION SYSTEM

This application claims the benefit of the earlier filed International Application No. PCT/IB99/01546, International Filing Date, 7 Sep. 1999, which designated the United States of America, and which international application was published under PCT Article 21(2) in English as WO Publication No. WO 00/14907.

BACKGROUND OF THE INVENTION

This invention relates to a communication system in which provision is made for the measurement of timing differences between base stations. The present invention is of particular advantage in an asynchronous CDMA (code division multiple access) telephone system.

FIG. 1 shows schematically the configuration of a typical cellular radio telecommunications system. The system comprises a number of base-stations (BSs) 1, 2, 3 etc. Each base-station has a radio transceiver capable of transmitting radio signals to and receiving radio signals from the coverage area or cell 4, 5, 6 etc. next to the base-station. By means of these signals the base-station can communicate with a mobile station (MS) 7 in that cell, which itself includes a radio transceiver. Each base station is connected to a mobile system controller (MSC) 8, which is linked in turn to the public telephone network 9. By means of this system a user of the mobile station 7 can establish a telephone call to the public network 9 via the base station in whose cell the MS is located.

It is desirable to maintain communication between the mobile station and the radio network when a mobile station moves out of the cell of a first base station and into the cell of a second base station. This is done by a handover process in which the mobile changes from the communicating with the first base station to communicating with the second base station. There are several types of handover process. In hard handover the mobile simple switches from communicating with the first base station to communicating with the second base station. This approach is used, for example, in the GSM radio telephone system. In soft handover the mobile can adopt an intermediate mode in which, when it is located in an area where the cells of the first and second base stations overlap, it communicates with both the first and second base stations—i.e. it can transfer user traffic information such as voice or data between itself and both of those base stations at the same time. This approach is used, for example, in the IS-95 radio telephone system. Soft handover is also proposed to be used in the ARIB/ETSI W-CDMA (Wideband-CDMA) system, details of the version of which are available at the ITU (International Telecommunication Union) website.

The transmissions in a radio communication system are typically organised into structural communication blocks that carry the data that is to be transmitted. For example, in the proposed W-CDMA system a superframe of 720 ms duration is divided into 72 frames of 10 ms. Each frame is divided into 16 timeslots of 0.625 ms, and each timeslot contains a number of symbols that carry the data itself. Superframes divided in this way are transmitted one after another.

In some radio communication systems the base stations are closely synchronised in time so that the transmissions of structural blocks from the base stations (such as superframes) begin at close times or closely fixed offset times. This can improve the radio performance of the system, for example, by reducing mobiles' search time (as in IS-95) and improving interference performance (as, for example, in a TDD system). For instance, in the IS-95 system the base stations are synchronised by means of the universal time information available from GPS (global positioning system) satellite transmissions. Using this universal time information all the base stations are synchronised to the chip level (typically around 1 μs or less). The timing offset of each base station is then transmitted to the mobile station. The requirement for synchronisation in this way makes base stations more difficult to deploy and more expensive to manufacture. Also, the system becomes dependant on the external timing source so the performance of the system is at the very least reduced if the external timing source is unavailable.

In other systems the base stations are unsynchronised or are only loosely synchronised. For example, the W-CDMA system is proposed to be almost totally asynchronous: the base stations are to be synchronised only to the superframe level (720 ms). This can be achieved relatively easily using the transmission network. Although this loosely synchronised approach makes it easy to deploy the base stations and reduces their cost it places high demands on the mobile stations. To cope with the looseness of the synchronisation each mobile station in the system must have a powerful synchronization search engine. The need for such powerful search engines will increase the cost of the mobile stations, which is a crucial factor in consumer-oriented mobile telephones, and increase the mobile's power consumption, reducing the standby/talk time of the mobile stations which is also a crucial issue to consumers. In addition, the synchronisation engines will take a substantial time to measure and process synchronisation information, for example for handover purposes, which may impair the operation of the mobile stations and the network—for example by delaying handovers.

BRIEF SUMMARY OF THE INVENTION

This invention aims to overcome at least some of the problems of synchronisation.

According to one aspect of the present invention there is provided a method for distributing timing information in a radio communication system comprising: a network including a plurality of base stations, each capable of transmitting and receiving radio communication signals to and from a respective coverage area, and including a first base station and one or more neighbouring base stations whose coverage areas neighbour the coverage area of the first base station; and a first mobile station capable of receiving signals from the first base station; the method comprising: estimating the differences in timing between those base stations; and transmitting indications of those differences in timing to the first mobile station.

The step of estimating the differences in timing may comprise establishing indications of the differences in timing. That step preferably comprises detecting a repeated characteristic of the communication signals and comparing the timing of that characteristic as received from the first base station and the neighbouring base stations with each other or with an independent clock signal. The repeated characteristic may, for example, be a dedicated timing signal or the beginning or end of a communication block such a superframe, frame or timeslot.

The step of estimating the differences in timing may comprise measuring those differences directly, e.g. by means of receiving the signals themselves and comparing their timings, or by another means such as comparing clock or other signals (e.g. over a wire link) of the base stations.

It is preferred that in addition to transmitting an indication of differences in timing to the first mobile station, an indication of the accuracy of that indication is also transmitted to the first mobile station.

Preferably the radio communication system comprises a second mobile station capable of receiving signals from at least two base stations of the set of base stations comprising the first base station and the neighbouring base stations. Preferably one of the said at least two base stations is the first base station. The step of receiving radio communication signals from those base stations and/or the step of estimating the difference in timing between those base stations is preferably performed by the second mobile station. Then, on establishing an indication of the difference in timing between the said two base stations the second mobile station preferably transmits an indication of that difference in timing to the network, e.g. to the first base station. This may suitably be done by means of radio communication from the second mobile station directly to the first base station, or alternatively by another route such as radio communication from the second mobile station to another base station and transfer of the data from there to the first base station.

On receiving an indication of a difference in timing (e.g. from the second mobile station) the network preferably stores that indication for transmission to the first mobile station and/or performs processing on the indication. This may be done, for example, at the first base station, at a dedicated unit or at a base station controller/radio network controller. The processing may be to refine the stored indication of timing difference, for example by processing the received indication together with a previously stored indication to generate a corrected indication that can then be stored for subsequent transmission to the first mobile station. This may allow the accuracy of the stored indication to be maintained even as base station timing drifts.

Whilst measuring timing differences the second mobile station may suitably be in a soft handover condition. Alternatively, it may be not in a soft handover condition.

As an alternative or in addition to the second mobile station the radio communication system may comprise a synchronisation estimation unit capable of receiving signals from at least two of the first base station and the neighbouring base stations. The step of receiving radio communication signals from those base stations and/or estimating the differences in timing between those base stations may then be performed by the synchronisation estimation unit. The synchronisation estimation unit may be a dedicated unit or may also perform other functions.

Preferably the indications of the timing differences are transmitted to the first mobile station by the first base station. This may be done by means of a message directed specifically to that mobile station or by a broadcast message for all or more than one mobile station (e.g. by means of a BCCH channel). The indication may suitably be transmitted to the first mobile station in response to the first mobile station establishing communication with the first base station or in response to a request from the first mobile station.

Preferably on receiving the indications of the timing differences the first mobile station stores those indications. The first mobile station may later use the indications: for instance in establishing communication with one of the neighbouring base stations and/or communicating with one of the neighbouring base stations and/or estimating the quality of a communications link with one of the neighbouring base stations. In establishing communication the first mobile station may make use of the received indications of timing difference to assist it in establishing a more precise measurement of the timing difference. In communicating with the neighbouring base station the first mobile station may communicate with the said neighbouring base station at the indicated timing difference. An estimate of the quality of a communications link with the neighbouring base station may be used in deciding whether the first mobile station should hand over fully or partially to or from the neighbouring base station.

The indication of timing difference for a neighbouring base station may suitably be an indication of the timing difference between that neighbouring base station and the first base station or an indication of the timing difference between that neighbouring base station and a standard time. The standard time may be directly available to the mobile stations and/or the base stations—for example by means of the GPS system.

Each base station may inform one or more mobile stations of the timing difference(s) between itself and one or more base stations. There may be means, provided for example in the RNC for checking that the timing differences to be transmitted by two or more of the base stations are consistent.

The said neighbouring base stations may include some or all of the base stations whose coverage areas are adjacent to and/or overlap that of the first base station. At least one of the neighbouring base stations may be a base station of a different communication network from the first base station and/or operable on a different frequency or different frequencies from the first base station. For example, one of the neighbouring base stations may be a base station operating according to different air interface specifications and rules from the first base station. There is no need for the neighbouring base stations to be base stations of a defined group (as in, for example, a neighbour list). The neighbouring base stations may number only one base station or may number more than one base station.

The radio communication system may be a mobile and/or cellular telephone system. The radio communication system may be a code division multiple access communication system, preferably a wideband-CDMA system. The radio communication system is preferably one in which some or all of the base stations are fully or partially asynchronous.

According to a second aspect of the present invention there is provided a radio communication system comprising: a network including a plurality of base stations, each being capable of transmitting and receiving radio communication signals to and from a respective coverage area, and having a first base station and one or more neighbouring base stations whose coverage areas neighbour the coverage area of the first base station; and a first mobile station capable of receiving signals from the first base station; wherein: the system comprises a timing estimator for estimating the difference in timing between the said at least two base stations and transmitting that indication to the network; and the network is capable of transmitting an indication of the difference in timing to the first mobile station. Preferably the system comprises a second mobile station capable of receiving signals from at least two of the first base station and the neighbouring base stations and of transmitting signals to the network, and the timing estimator is comprised in the second mobile station.

According to a third aspect of the present invention there is provided a base station for a radio communication system comprising a network including a plurality of base stations, each being capable of transmitting and receiving radio communication signals to and from a respective coverage area, there being one or more neighbouring base stations whose coverage areas neighbour the coverage area of the said base station, the said base station comprising: a radio communication device for communicating with a first mobile station; a memory for receiving timing difference information indicating the differences in timing between the base station and the neighbouring base stations; and transmission control apparatus for causing the radio communication device to transmit the timing difference information to the first mobile station.

BRIEF DESCRIPTION OF THE SEVERAL VIEWS OF THE DRAWING

The present invention will now be described by way of example with reference to the accompanying drawings, in which.

An example of the present invention as embodied in a W-CDMA telecommunications system will now be described. It will be appreciated that this is merely a non-limiting example, and that the present invention can be used in other systems.

DETAILED DESCRIPTION OF THE INVENTION

As explained above, it is proposed that in the W-CDMA system base stations will only be synchronised to the superframe level (720 ms). The present example aims to improve on prior systems by collecting information on the timing differences between neighbouring base stations. This information is then transmitted to the mobile stations. With this information the mobile stations can quickly synchronise with and establish communication with a new base station without the need for a powerful synchronisation engine, or (since less searching of code-time space may be needed) faster (i.e. with reduced search time) and without the need to decode the BCCH of the new base station. Also, this performance improvement can be made without any need to tighten the synchronisation between base stations. Furthermore, as will be described below, the need for TX off slots in inter-frequency and inter-system measurements can be greatly reduced. These factors can potentially reduce the risk of bad quality or dropped calls and also help in improving the network performance (e.g. capacity).

Figure 1:
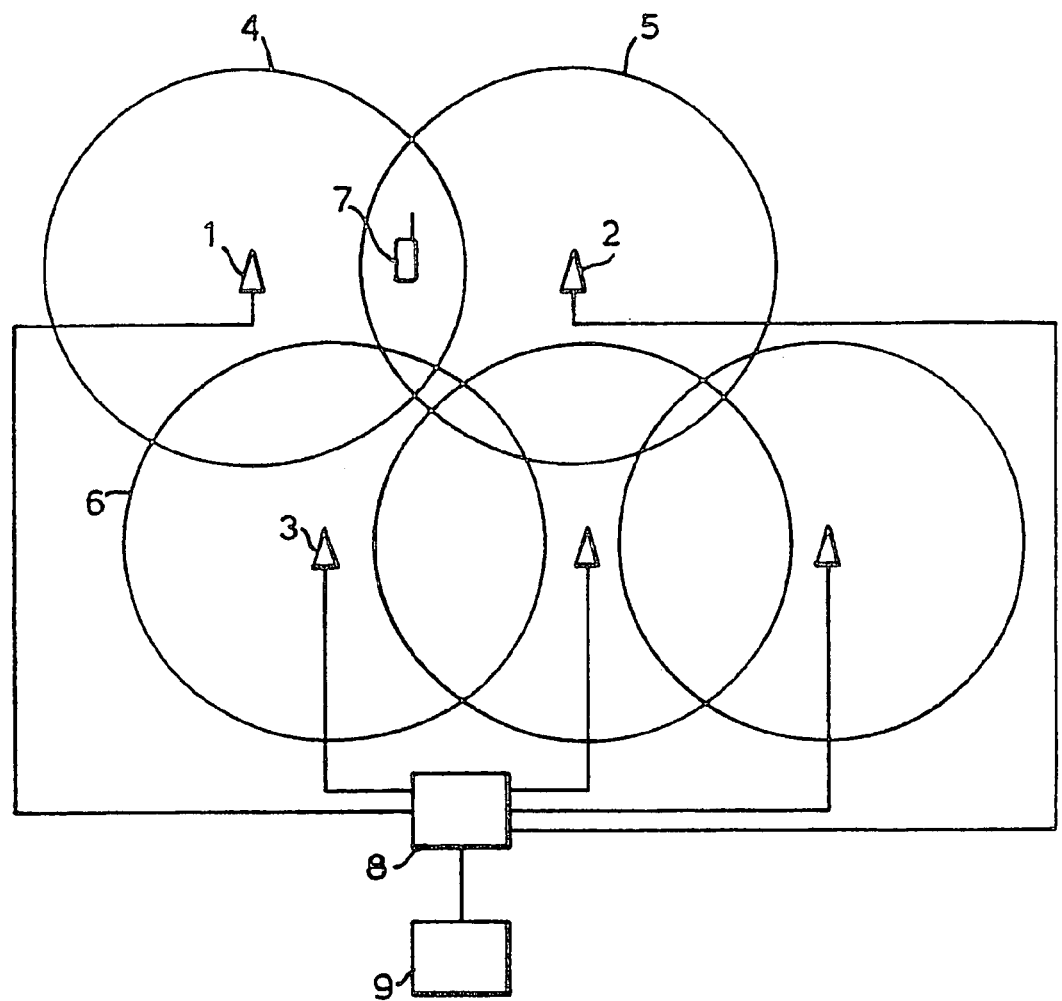
FIG. 1 shows schematically the configuration of a typical cellular radio telecommunications network.
Figure 2:
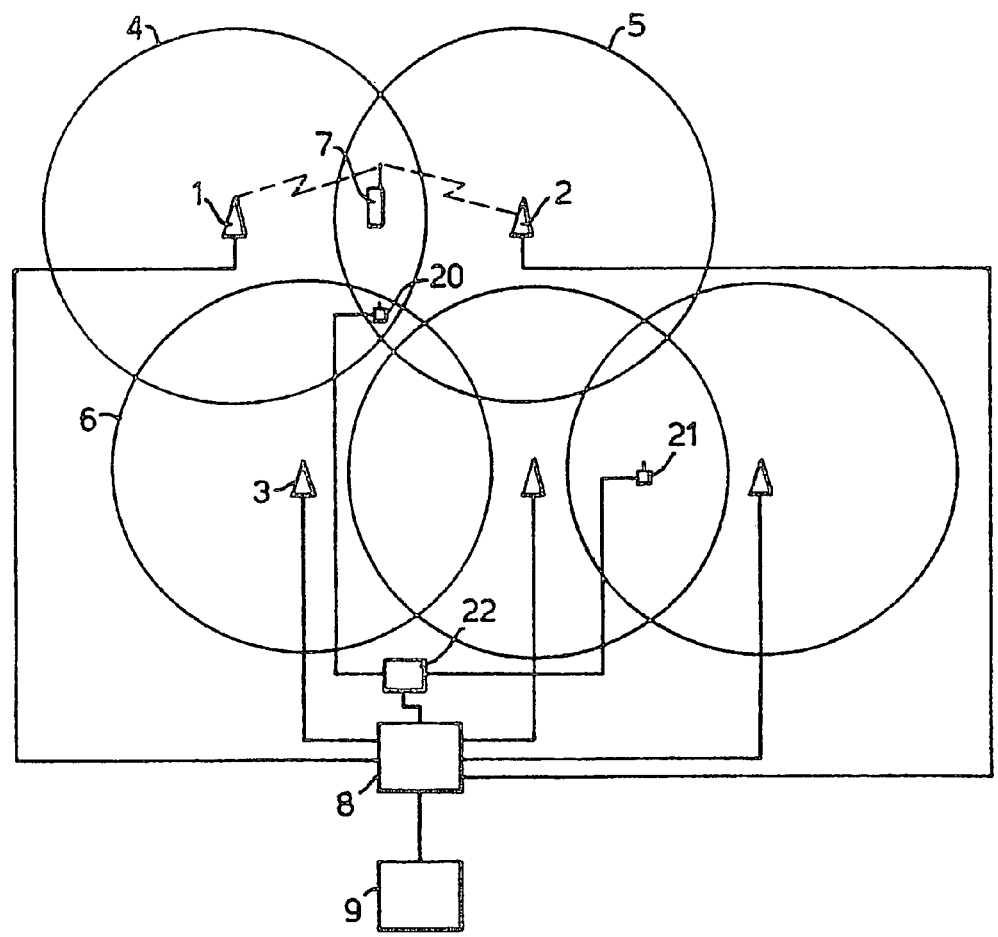
FIG. 2 shows schematically the configuration of another cellular radio telecommunications network.
Figure 3:
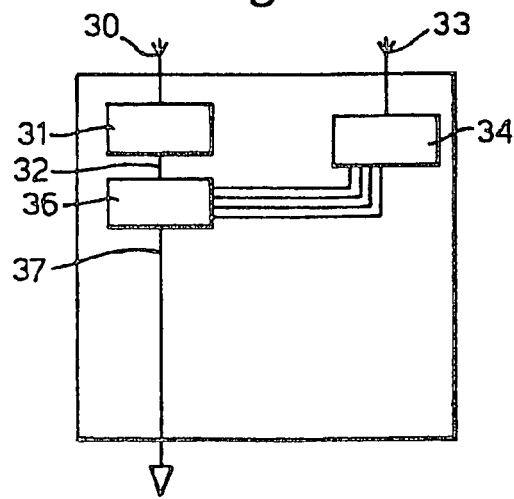
FIG. 3 shows the architecture of a synchronisation measurement unit.

The first step is to establish the timing differences between neighbouring base stations. This could be done in numerous ways. One way is illustrated in FIG. 2, in which like components of the network are numbered as for FIG. 1. In the system of FIG. 2 additional synchronisation measurement units 20, 21 are provided. The general architecture of a synchronisation measurement unit is shown in FIG. 3. The unit comprises a GPS antenna 30 for receiving GPS signals from GPS satellites. The received GPS signal is provided to a GPS decoder 31 which decodes the GPS signals and provides a universal time output at 32. The unit also comprises a W-CDMA antenna 33 which provides a received W-CDMA signal to a W-CDMA decoder 34 which could be similar to the receiver used in a W-CDMA mobile station. The W-CDMA decoder receives signals from nearby W-CDMA base stations and the signals 35 from each of those base stations are passed with the universal time output to a synchronisation measurer 36. The synchronisation measurer establishes the deviation of the timing of each of the received base station signals from universal time and outputs this deviation information at 37. The deviation information from all the synchronisation measurement units is passed to a synchronisation database 22 (FIG. 2) which stores the measured deviations for each base station from universal time. The synchronisation units may update the deviation information periodically.

A mobile station may request timing deviation information for base stations or the network may send the information to the mobiles regularly (e.g. on the BCCH) or in response to a certain event—for example a request for handover or for network internal reasons, like initiating an inter-frequency or intersystem handover for e.g. load reasons. When timing deviation information is to be sent to a mobile station the information is transferred from the synchronisation database to the base station with which the mobile station is in communication. That base station then transmits the deviation information to the mobile station. The transmitted deviation information may cover all the base stations in the network, or only some of them—for instance only those that are near to or only those that are neighbours of the base station(s) with which the mobile station is in communication. Instead of, or in addition to, the deviation information being stored at the synchronisation database, the deviation information may be stored at individual base stations. The mobile station may be in a soft handover condition, in which it is communicating with more than one base station; the deviation information may then be sent to the mobile station by any or all of those base stations. Alternatively, the mobile may not be in active communication but may still be measuring some of the base stations, e.g. for preparation to start communications.

An alternative unit that could conveniently perform storage and/or processing of the timing indications is the base station controller (known as an RNC (radio network controller) in the W-CDMA system). This may be used to process and store the results of timing measurements, and send them back to the mobile stations via the base stations. One preferred route for this is by means of the BCCH, at least for normal intra-frequency handovers. As inter-frequency and inter-system handovers (see below) require, at least for simpler systems, transmission-free slots in the downlink direction, and these normally need to be negotiated between the mobile and base station, the same means as is used for that negotiation could be used for transmitting the timing indication. This could be a dedicated signalling connection.

As an alternative to the use of the GPS system for timing, each base station could detect or have reported to it the timing difference between itself and a neighbouring base station.

Another way to establish the timing differences between neighbouring base stations is by means of the mobile stations themselves. Timing differences are already proposed to be measured in the W-CDMA system as part of the process for determining whether or not any form of handover should be made. In W-CDMA this is necessary as the mobile station needs to inform the base station system of the timing difference between the base stations so that the new base station timing for this mobile connection to be set up can be adjusted such that the mobile receives the signals from the two base stations practically at the same time (within the same data symbol). Of course additional measurements can be made during soft handover too, because when a mobile station is in a soft handover condition it is in communication with more than one base station. In the W-CDMA proposal mobile stations are required to report to base stations timing differences between base stations to a chip level. To enable the reporting of these differences to other mobile stations the reported time differences could be stored at the base station to which they were reported, or at a wider range of base stations, or the reported time differences could be passed by the base stations to a synchronisation database as described above. The deviation information could then be sent to a mobile station as described above. The base stations would not need to alter their synchronisation to reduce the timing differences.

To determine the time differences between base stations accurately the location of the measuring apparatus should ideally be known—this allows factors such as propagation delay to be taken into account. One advantage of the synchronisation measurement units of FIG. 2 is that their locations can be fixed to allow time differences to be determined more accurately. However, it is anticipated that in the W-CDMA system mobile stations will frequently be in soft handover. Therefore, it can be expected that, although the location of each mobile station may not be known precisely, time differences can still be determined accurately. For example, the time differences reported by different mobile stations could be averaged. Thus, it should be possible to reach an accuracy of 62.5 µs or less. The clock in the mobile station should be sufficiently accurate and stable that it does not introduce too much error into the measurements. Knowledge of the location of the mobile station could be used to enhance the accuracy of the estimated time differences. This knowledge could be derived from a number of sources, including GPS and positioning services provided by the cellular network itself (e.g. as currently demanded by the FCC).

Since there are uncertainties (typically of larger than chip duration) in the measurement accuracy, it is preferable to be able to inform the mobile stations also of the estimated accuracy of the timing differences that are reported to them, so that they may make best use of the timing difference information. To achieve this the units that measure the timing differences should preferably also provide an indication of the accuracy of the measurement, and this should also be transmitted to the mobile stations.

Each base station in the W-CDMA system is controlled by a base station controller (RNC) which maintains a list of neighbour base stations to the base station in question. The same list could be maintained by the base station itself. A base station in this system can suitably report to a mobile station the timing differences for itself and the base stations on the neighbour list. To reduce unnecessary communications it preferably does not report timing differences for any other base stations. The mobile station can then store these timing differences and when it needs to establish communication with or measure (e.g. the signal quality from) one of the neighbouring base stations (for instance to fully hand over to or from or enter a soft handover condition with that base station) can use the stored timing differences to allow it to quickly establish synchronisation with the neighbouring base station.

One way for a base station to report timing differences to a mobile station is using a system information channel. One scheme for coding the timing differences and their accuracy is illustrated in the following table.

| Code | Measurement accuracy (step) | Estimate of timing difference |
|------|----------------------------|-------------------------------|
| 00 | Asynchronous (or 720 ms) | — |
| 01 | 62.5 µs (symbol) | 0 to $1.15 \times 10^4$ steps of 62.5 µs |
| 10 | 625 µs (slot) | 0 to $1.15 \times 10^3$ steps of 625 µs |
| 11 | 10 ms (frame) | 0 to $7.2 \times 10^2$ steps of 10 ms |

An additional code for chip level synchronisation could also be added.

The timing differences may be reported as differences from the timing of the base station that performs the reporting, or as differences from a universal timing (in which case a timing difference for the reporting base station itself may be sent) or in another way.

The principle described above may be extended to inter-mode handover (e.g. from W-CDMA FDD to W-CDMA TDD), inter-frequency handover (IFHO) and inter-system handover (ISHO); and inter-mode, inter-frequency and inter-system measurement (e.g. of signal quality). Again, the timing differences could be measured by the mobile stations (either automatically or on demand) and/or by dedicated synchronisation measurement units, and/or by other means such as GPS or transmission line.

In IFHO the same scheme for coding the time differences as in the case of basic handover could be used. If the handover is between two frequencies of the same base station site then the synchronisation could be fixed, or there could be synchronisation to the chip level. A special case in the signalling scheme could be provided to indicate this. When synchronisation is measured by means of the mobile stations themselves, the mobile stations could be required to report the timing difference by the old (pre-handover) connection, or by the new connection that is established after the handover. (A change to the specification may be needed to require mobile stations to support this).

The present invention may be found especially useful in inter-system handovers. There, in a normal W-CDMA system, the mobile station and the base station need to create transmission free periods into the normally continuous W-CDMA transmission for the mobile to be able to measure the other system (which could, for example be a GSM system). Typically half of a frame (5 ms) needs to be made available once in a few frames for the mobile to search for the GSM synchronisation and BSIC. If the timing difference between the W-CDMA and GSM base stations were known, the W-CDMA base station could arrange the transmission free slots to coincide with the GSM timing information slots, thereby drastically reducing the required number of the transmission free slots and speeding up the measurement. In intersystem measurements this benefit is potentially more than in inter-frequency measurements as the timings of the two systems are potentially not so compatible and also as in inter-system measurements the mobile too may need to turn off transmission, not just the base station.

In ISHO, for example between the W-CDMA system and another system such as GSM, the same coding scheme as above could be used. Alternatively, the coding scheme could be altered to fit better with the characteristics of the other system. When synchronisation is measured by means of the mobile stations themselves, the mobile stations could be required to report the timing difference by the old (pre-handover) connection in the old system, or by the new connection that is established after the handover in the new system. (A change to the specification may be needed to require mobile stations to support this). The measured timing difference could be utilised not just by reporting it to the mobiles but also by the network by making exactly the correct time slots available (i.e. free of unwanted transmissions) for measurements by the mobiles.

In each case where an indication of timing differences (and optionally their accuracy) is received by a unit (e.g. an RNC, base station or mobile station) that unit could store the indication(s). The unit could also perform processing on the indications, for example to refine the data. For instance, on receiving one or more subsequent indications the unit could use that data (by simple averaging or more complex means) to improve its estimate of the timing differences. It could also then adjust stored accuracy accordingly. To allow this to be done a unit that is to store the indications can be provided with a memory for storing a set of timing differences and associated with each one information defining the base station(s) to which that timing difference applies and optionally the accuracy of the timing difference, and a processor for performing processing on those indications and storing the result in the memory. The memory is preferably accessible to transceiver apparatus where the unit is a mobile station or a base station so that the indications can be used for communicating with or measuring the signals from base stations or for transmission to mobile stations. Where the unit is a mobile station this arrangement has the advantage that it can make efficient use of information received from more than one base station.

The term mobile station as used herein does not imply that the station is mobile. The location of a mobile station may be changeable or fixed.

The applicant draws attention to the fact that the present invention may include any feature or combination of features disclosed herein either implicitly or explicitly or any generalisation thereof, without limitation to the scope of any of the present claims. In view of the foregoing description it will be evident to a person skilled in the art that various modifications may be made within the scope of the invention.

What is claimed is:

1. A method for distributing timing information in a radio communication system comprising:
    a network including a plurality of base stations, each capable of transmitting and receiving radio communication signals in at least a first mode to and from a respective coverage area in at least a first communication network, and including a first base station and one or more neighbouring base stations whose coverage areas neighbour the coverage area of the first base station; and
    a first mobile station capable of receiving signals from the first base station; the method comprising:
    estimating the differences in timing between those base stations; and
    transmitting indications of those difference in timing and transmitting indications of the accuracy of those differences to the first mobile station.

2. A method as claimed in claim 1, comprising receiving radio communication signals from the first base station and the neighbouring base stations and thereby estimating the differences in timing between those base stations.

3. A method as claimed in claim 1, wherein the radio communication system comprises a second mobile station capable of receiving signals from at least two of the first base station and the neighbouring base stations, and wherein the step of estimating the differences in timing is performed by the second mobile station.

4. A method as claimed in claim 3, wherein on estimating the differences in timing between the said two base stations the second mobile station transmits an indication of that difference in timing to the network.

5. A method as claimed in claim 4, wherein the second mobile station transmits the indication of that difference in timing to the first base station by radio communication from the second mobile station to the first base station.

6. A method as claimed in claim 1, wherein the network comprises a synchronisation estimation unit capable of receiving signals from at least two of the first base station and the neighbouring base stations, the step of estimating the differences in timing between those base stations is performed by the synchronisation estimation unit.

7. A method as claimed in claim 4, wherein on receiving the indication of the difference in timing the network stores that indication for transmission to the first mobile station.

8. A method as claimed in claim 4, wherein on receiving the indication of the difference in timing the network generates a code pertaining to the accuracy of the difference in timing that exists between neighbouring base stations.

9. A method as claimed in claim 4, wherein on receiving the indication of the difference in timing the network performs processing on that indication and the accuracy of that difference.

10. A method as claimed in claim 8, wherein the storage and/or processing of the indication of the difference in timing and the accuracy of that timing is performed by a radio network controller.

11. A method as claimed in claim 1, wherein the indications of the timing differences and the accuracy of those differences are transmitted to the first mobile station by the first base station.

12. A method as claimed in claim 1, wherein on receiving the indications of the timing differences and the accuracy of those differences the first mobile station stores those indications.

13. A method as claimed in claim 1, wherein in establishing communication with one of the neighbouring base stations the first mobile station makes use of the received indications of timing difference for that neighbouring base station.

14. A method as claimed in claim 1, wherein in estimating the quality of a communication link with one of the neighbouring base stations the first mobile station makes use of the received indications of timing difference for that neighbouring base station.

15. A method as claimed in claim 1, wherein the indication of timing difference for a neighbouring base station is an indication of the timing difference between that neighbouring base station and the first base station.

16. A method as claimed in claim 1, wherein the indication of timing difference for a neighbouring base station is an indication of the timing difference between that neighbouring base station and a standard time.

17. A method as claimed in claim 1, wherein at least one of the neighbouring base stations is a base station of a communication network different from said at least one communication network of the first base station.

18. A method as claimed in claim 1, wherein at least one of the neighbouring base stations is a base station of a different operating frequency from the first base station.

19. A method as claimed in claim 1, wherein at least one of the neighbouring base stations is a base station operating according to different air interface specifications and/or rules from the first base station.

20. A method as claimed in claim 1, wherein at least one of the neighbouring base stations is operable to transmit and/or receive signals of a mode different from said at least one mode of the first base station.

21. A method as claimed in claim 1, wherein the radio communication system is a mobile telephone system.

22. A method as claimed in claim 1, wherein the radio communication system is a code division multiple access communication system.

23. A radio communication system comprising: a network including a plurality of base stations, each being capable of transmitting and receiving radio communication signals to and from a respective coverage area, and having a first base station and one or more neighbouring base stations whose coverage areas neighbour the coverage area of the first base station; and a first mobile station capable of receiving signals from the first base station; wherein:

the system comprises a timing estimator for estimating the difference in timing between the said at least two base stations and transmitting that indication to the network; and the network is capable of transmitting an indication of the difference in timing and the accuracy of that difference to the first mobile station.

24. A radio communication system as claimed in claim 23, wherein the system comprises a second mobile station capable of receiving signals from at least two of the first base station and the neighbouring base stations and of transmitting signals to the network, and the timing estimator is comprised in the second mobile station.

25. A base station for a radio communication system comprising a network including a plurality of base stations, each being capable of transmitting and receiving radio communication signals to and from a respective coverage area, there being one or more neighbouring base stations whose coverage areas neighbour the coverage area of the said base station, the said base station comprising:

a radio communication device for communicating with a first mobile station;

a memory for receiving timing difference information indicating the differences in timing between the base station and the neighbouring base stations; and a memory for receiving information indicating an estimate of the accuracy of the timing difference information; and transmission control apparatus for causing the radio communication device to transmit the timing difference and accuracy of this difference information to the first mobile station.

* * * * *